United States Patent
Roser

[15] 3,648,560
[45] Mar. 14, 1972

[54] SELF-EXTRUDING SCREW
[72] Inventor: Kenneth L. Roser, Rockford, Ill.
[73] Assignee: Keystone Consolidated Industries, Inc., Peoria, Ill.
[22] Filed: June 9, 1970
[21] Appl. No.: 45,173

[52] U.S. Cl. ................................................... 85/47
[51] Int. Cl. .............................................. F16b 25/00
[58] Field of Search ................... 85/47, 41; 10/152 T, 152

[56] References Cited

UNITED STATES PATENTS

| 2,703,419 | 3/1955 | Barth | 85/47 |
| 3,093,028 | 6/1963 | Mathie | 85/41 |
| 3,124,408 | 3/1964 | Oestereicher | 85/47 |
| 3,207,024 | 9/1965 | Sommer | 85/47 |
| 3,438,299 | 4/1969 | Gutshall | 85/41 |

FOREIGN PATENTS OR APPLICATIONS

| 832,220 | 2/1952 | Germany | 85/47 |
| 50,995 | 1/1910 | Switzerland | 85/41 |

Primary Examiner—Marion Parsons, Jr.
Attorney—Wilson & Geppert

[57] ABSTRACT

A self-extruding screw used for thin gage sheet metal to provide increased holding power, with the screw having an enlarged head, a threaded shank and a generally tapered thread-free point with a flattened side parallel the screw axis extending from adjacent the base of the conical tip to a point short of the threaded shank. An angular groove is formed in the tapered point to extend therearound, partially interrupted by the flattened surface, from adjacent the conical tip to and merging into the threads of the shank.

3 Claims, 5 Drawing Figures

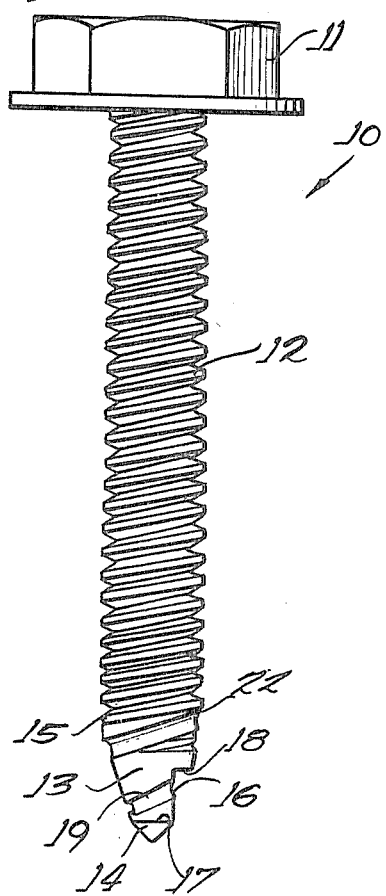
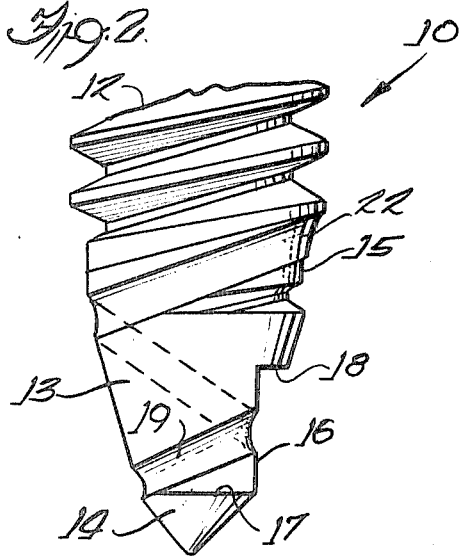
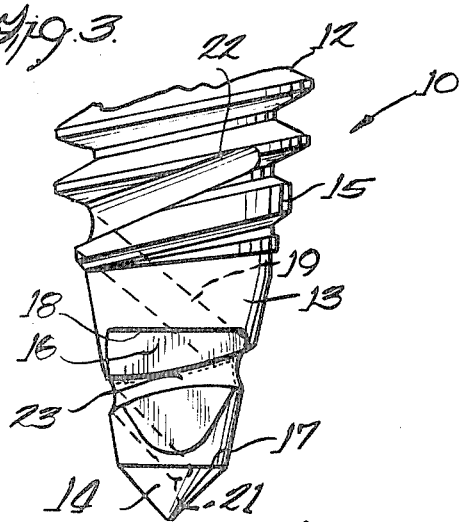
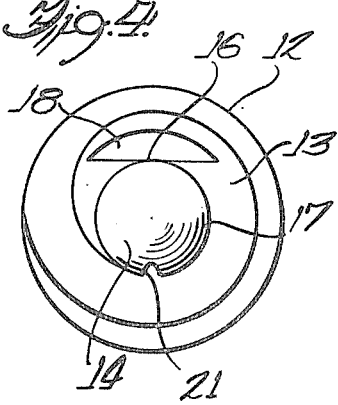
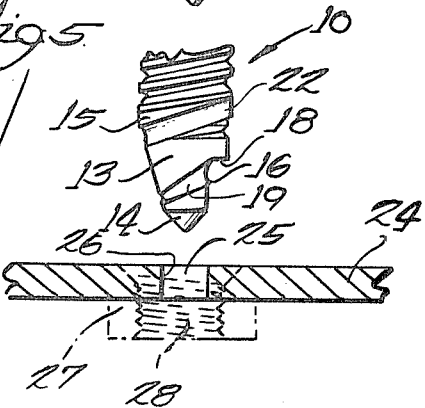

SELF-EXTRUDING SCREW

The present invention relates to a novel screw construction, and more particularly to a self-extruding screw to provide adequate holding power in thin gage sheet metal.

In numerous sheet metal applications today, very thin steel is used for a variety of reasons. The available fasteners that are used in this material, because of their size and thread pitch, do not in many cases provide adequate thread engagement. The lack of a sufficient amount of thread engagement causes failure of the mating thread if the torque to tighten the screw is too high. The torque value to clamp the assembly together is normally critical; however, in many cases it is too high of a value for the amount of thread engagement that can be achieved in thin steel material. The present self-extruding screw obviates the present problems with an improved thin sheet metal fastener.

Among the objects of the present invention is the provision of a self-extruding screw which, when used with a proper pilot hole in thin sheet metal, will increase the thickness of the thin gage sheet metal by means of extruding the metal surrounding the pilot hole in the direction the screw is moving. The amount of extruded material will depend largely on the pilot hole size and the hardness of the material it is going into.

Another object of the present invention is the provision of a self-extruding screw which has been able to increase, up to twice the thickness, the surface of the thin sheet metal engaged by the screw, which in turn doubles the amount of thread engagement possible. In addition, the increase in the amount of thread engagement will provide for the obtaining of higher torque values before strip-out of the mating thread or breakage of the screw occurs.

A further object of the present invention is the provision of a self-extruding screw having a threaded shank and a thread-free extruding point having a pilot tip for locating misaligned holes, a flat portion on the point for working the material in a downward direction and ironing out imperfections caused by piercing or drilling of the hole, and an angular groove on the point which pulls the point into and through the hole with little end-pressure required. The groove runs into and merges in the threaded shank so that the extruding of the pilot hole and the subsequent thread forming takes place in one continuous motion or operation.

Further objects are to provide a construction of maximum simplicity, efficiency, economy and ease of assembly and operation, and such further objects, advantages and capabilities as will later more fully appear and are inherently possessed thereby.

In the drawing:

FIG. 1 is a side elevational view of the self-extruding screw of the present invention.

FIG. 2 is an enlarged side elevational view of the extruding point of the screw of FIG. 1.

FIG. 3 is a side elevational view of the extruding point of FIG. 2 rotated through 90°.

FIG. 4 is an end elevational view of the extruding point of the screw.

FIG. 5 is an exploded side elevational view of the extruding point and the resultant extruded and threaded opening in a thin gage sheet metal plate.

Referring more particularly to the disclosure in the drawing wherein is shown an illustrative embodiment of the present invention, FIG. 1 discloses a self-extruding screw 10 having an enlarged head 11 of a suitable configuration for driving the screw, a threaded shank 12 having a thread thereon of a constant pitch and diameter and a tapered thread-free extruding point 13 terminating at its lower end in a conical tip 14. The threaded shank 12 has a short tapered section 15 of reduced diameter threads which merge into the tapered point 13.

As seen in FIGS. 2, 3 and 4, the tapered point 13 has a generally smooth tapered surface interrupted by a flattened surface 16 extending from a point closely adjacent the base 17 of the conical tip 14 for a distance of approximately two-thirds the length of the point and terminates in a shoulder 18 perpendicular to the axis of the screw and spaced from the lower edge of the reduced thread section 15. The flattened surface 16 is parallel to but offset from the axis of the screw.

Also formed on the tapered extruding point 13 is an angular groove 19 extending from a point 21 closely adjacent the base 17 of or slightly into the tip 14 completely around the tapered point to merge at 22 into the reduced thread section 15. The groove 19 is at least partially interrupted to provide a shallower groove 23 across the flattened surface 16, and the single rounded groove has a constant and substantially higher pitch than the pitch of the threaded shank 12. The groove 19 gradually increases in width from the initial point 21 to the flattened surface 16, is narrower and shallower at 23 across the surface 16, and is of constant width from the surface 16 to its merging into the threaded shank at 22.

In operation, a thin gage sheet metal plate 24 (FIG. 5) has a small pilot opening 25 of the approximate diameter of the base 17 of the conical pilot tip 14 of the screw. The conical pilot tip 14 of the screw acts to align the screw with the pilot opening 25 and to locate misaligned holes in two or more plates or workpieces. Upon the pilot tip 14 entering the opening 25, the flattened surface 16 and the angular groove 19 will engage the edge 26 of the opening 25. The flattened portion 16 works the material of the plate 24 surrounding the opening 25 downward as shown in dotted outline at 27 in FIG. 5 in the direction of movement of the screw and acts to iron out imperfections occurring in the material due to the piercing or drilling of the hole 25.

The angular groove 19 on the tapered point 13 engages with the material being extruded and acts to pull the point downward into and through the opening with little end-pressure required. Without the groove 19, a great deal of end-pressure would be required to force the point 13 through the opening 25, as the hole is smaller than standard and there are no external threads on the point. Once past the flattened surface 16, the reduced threaded section 15 engages the internal surface of the extruded opening followed by the full depth threaded shank 12 to gradually form or swage a thread 28 into the extruded material. It is most important that the angular groove 19 runs into and merges in the externally threaded area 15 so that extruding the pilot opening and the formation of the threads takes place in one continuous motion.

Although shown with a narrow and shallow groove 23 extending across the flattened surface, the width of the groove will vary and the flattened surface 16 may completely interrupt the angular groove 19 for a small distance depending on where the groove 19 crosses the surface 16. Also, the groove, if only partially interrupted, will have its edges generally converge and then diverge as shown in FIG. 3 of the drawing as the groove extends across the surface 16.

This fastener acting upon thin gage sheet metal will allow continued use of thin gage sheet metal, such as thin gage steel material, and provide adequate screw holding power. The screw acts to substantially double the amount of thread engagement possible with thin gage sheet metal and, in addition, higher torque values are also obtained before strip-out of the mating thread or breakage of the screw occurs.

Having thus disclosed my invention, I claim:

1. A self-extruding screw for use in a pilot opening in thin gage sheet metal to increase the thread engagement possible between the screw and the sheet metal, comprising an enlarged head, a threaded shank and an extruding point at the end of the screw opposite the head, said extruding point having a generally smooth tapered surface extending between the end of the threaded shank and a conical tip, a flattened surface formed on the point parallel to but offset from the axis of the screw and extending from a point adjacent the conical tip to a squared-off shoulder perpendicular to the axis of the screw and spaced from the end of the threaded shank, said flattened surface extending for approximately two-thirds the total axial distance of the extruding point, and an angular groove on said extruding point extending for approximately one and one-half revolutions around the extruding point from a point closely adjacent the conical tip to and merging into the threaded shank, said groove having a gradually increasing width from the conical tip to the flattened surface and a generally constant width from the flattened surface to the threaded shank with the pitch of the groove being constant and substantially greater than the pitch of the threaded shank, said threaded shank having a tapered portion providing threads of decreasing depth adjacent the extruding point with the angular groove merging into the threaded portion of decreasing thread depth, said flattened surface partially interrupting the groove.

2. A self-extruding screw as set forth in claim 1, in which the angular groove extending across the flattened surface is narrower and shallower than the groove on the remainder of the extruding point.

3. A self-extruding screw as set forth in claim 1, in which the flattened surface completely interrupts the angular groove for a portion of the flattened surface.

* * * * *